(No Model.)
J. N. PEW.
VALVE.
No. 556,024.   Patented Mar. 10, 1896.
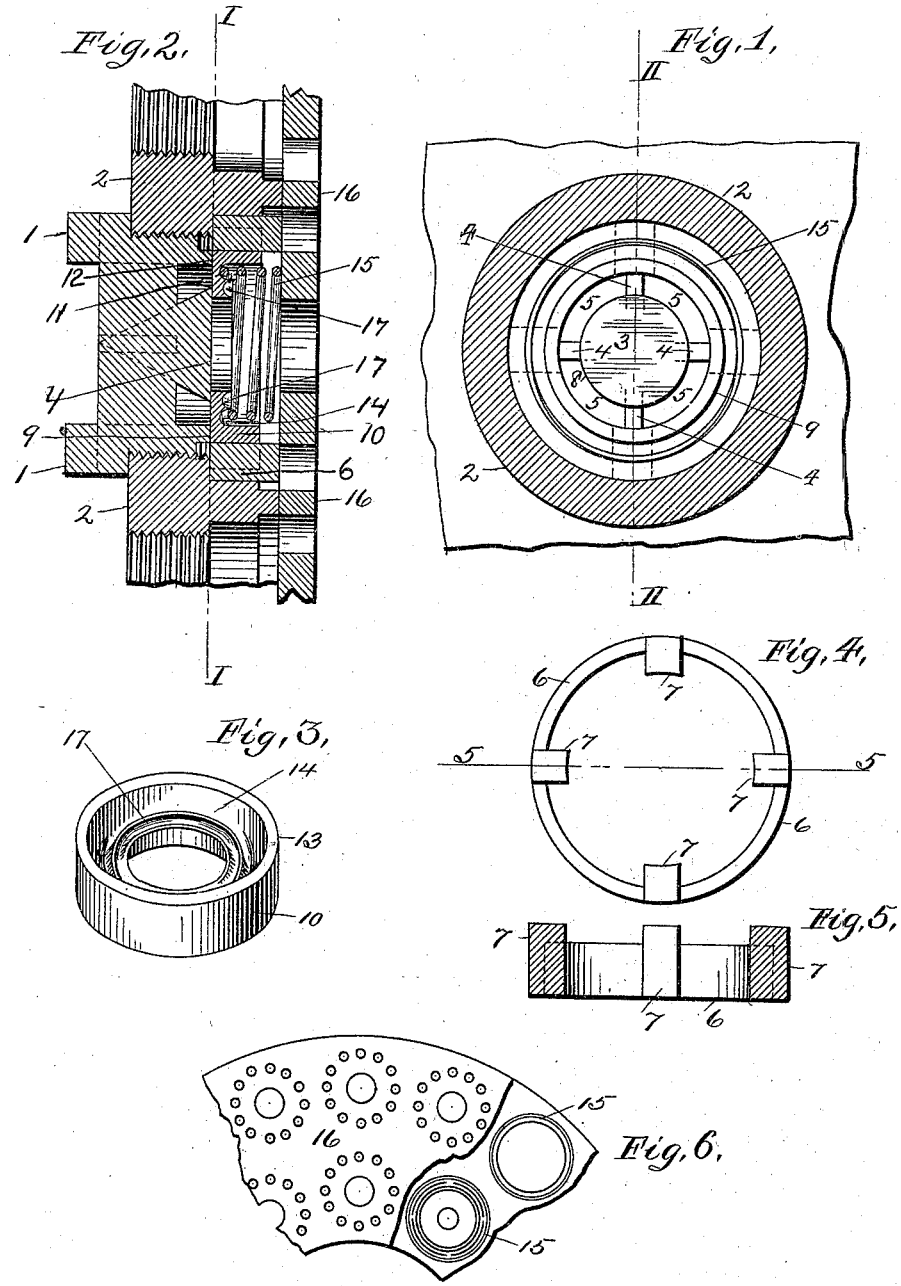

UNITED STATES PATENT OFFICE.

JOSEPH N. PEW, OF PITTSBURG, PENNSYLVANIA.

VALVE.

SPECIFICATION forming part of Letters Patent No. 556,024, dated March 10, 1896.

Application filed December 1, 1894. Serial No. 530,547. (No model.)

*To all whom it may concern:*

Be it known that I, JOSEPH N. PEW, a citizen of the United States, residing at Pittsburg, in the county of Allegheny and State of Pennsylvania, have invented or discovered new and useful Improvements in Valves, of which the following is a specification.

In the accompanying drawings, which make part of this specification, Figure 1 is a horizontal section on line 1 1 of Fig. 2. Fig. 2 is a vertical section on line 2 2 of Fig. 1. Fig. 3 is a perspective of the valve; Fig. 4, a plan of guide-ring; Fig. 5, a section of guide-ring on line 5 5 of Fig. 4, and Fig. 6 a broken plan view of plate covering a series of valves. The drawings illustrate inlet-valves.

My invention relates to the class of lifting-valves, and has been specially designed for use on gas-compressors and in connection with natural-gas service. However, the principle of the valve is applicable to a variety of uses, as for other gases, air and for liquids generally, and I intend to claim the same broadly.

The primary purpose of my invention summarily stated is to secure in a valve the maximum area of discharge with a minimum lift of the valve. Secondly, my valve is made of the minimum amount of metal and hence its weight is much less than that of other valves having an equal area of discharge. This is an important consideration, as it reduces the wear both of the valve and of its seat and the liability of breaking from the knocking of heavy parts together. Despite this reduction in weight the valve is durable, steady and reliable in its movements.

In the accompanying drawings, which make part of this specification, 1 is the valve-seat, which is screwed into the head 2. Said valve-seat is provided with a hub 3, supported by radial wings 4 4.

5 5 are ways between the wings 4 4.

6 is a ring having internal guides 7 7, said ring being secured in the head around the periphery of the valve.

A ground seat is provided at 8 around the periphery of hub 3 and a ground seat is provided at 9 around the periphery of the ways 5 5.

10 is the valve. Its general form is that of a ring, the diameter of the opening in the center being less than that of the hub 3. Said valve is provided at 11 and 12 with ground seats. The periphery of the valve has a flange 13, which slides upon the guides 7 7. At 14 the valve has a circular recess to seat the spring 15, said spring being retained in position between the under side of the perforated plate 16 and the valve. 17 is an annular cup in the valve, which acts as a trap for the gas or fluid and tends to force the valve quickly to its seat in the act of closing.

The increased efficiency of the valve can be readily understood. As soon as the valve lifts, the area of discharge is not confined to the ring-space between the exterior of the valve and the interior of the ring, but simultaneously by the separation of the seats 8 and 11 an additional discharge-port is open and a free discharge is given through the center of the valve. This discharge escapes readily through openings in the perforated plate 16, there being nothing to oppose its exit except a very slight obstruction offered by the spring 15. This free and unimpeded discharge constitutes one of the most valuable and salient features of the invention. The results of the construction are that a slight lift of the valve passes a greatly-increased amount of gas or liquid over the valves in ordinary use. Necessarily also as a shorter lift will accomplish a greater discharge, the valve will close more quickly, a feature of much importance.

The movements of the valve are steady and balanced through the bearing of the flange 13 upon the guides 7 7.

The drawings of the patent show a flat seat to the valve, but obviously an oblique beveled seat may be substituted.

If the valve is set in a vertical position it may close itself by back pressure or gravity, and the spring in such a position may be omitted.

While I prefer a stemless valve, as the weight is much reduced, the principle of my valve may be used with a stem-valve.

The guides 7 7 may be cast as a part of the head instead of being an independent ring.

Having described my invention, I claim—

1. The combination of a valve-cage having a seat; a ring detachably secured in the interior of said cage above the level of said seat and having internal guides for the movements of a valve; a ring-valve moving between said guides and a perforated plate closing the discharge end of the cage.

2. The combination of a valve with a perforated base; a valve-case having an unobstructed central discharge; guides for the periphery of the valve and a perforated plate closing the discharge end of the case.

In testimony whereof I have hereunto set my hand this 12th day of November, A. D. 1894.

JOSEPH N. PEW.

Witnesses:
WM. L. PIERCE,
R. W. MILLER.